L. J. Knowles.
Loom.

N°15,186. Patented Jun. 24, 1856.

L. J. Knowles.
Loom.
Nº 15,186.  Patented Jun. 24, 1856.
Sheet 2-2 Sheets.
Fig: 2.
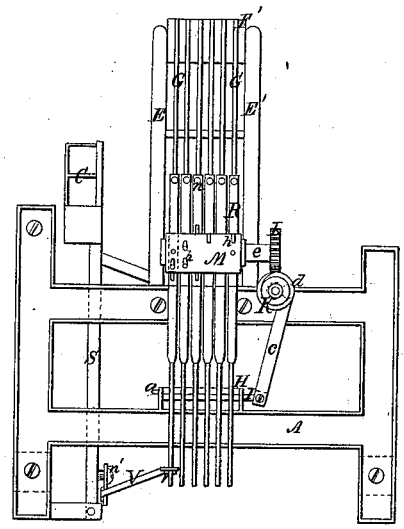
Fig: 5.
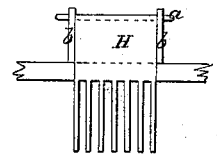
Fig: 6.
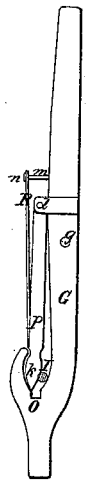
Fig: 3.
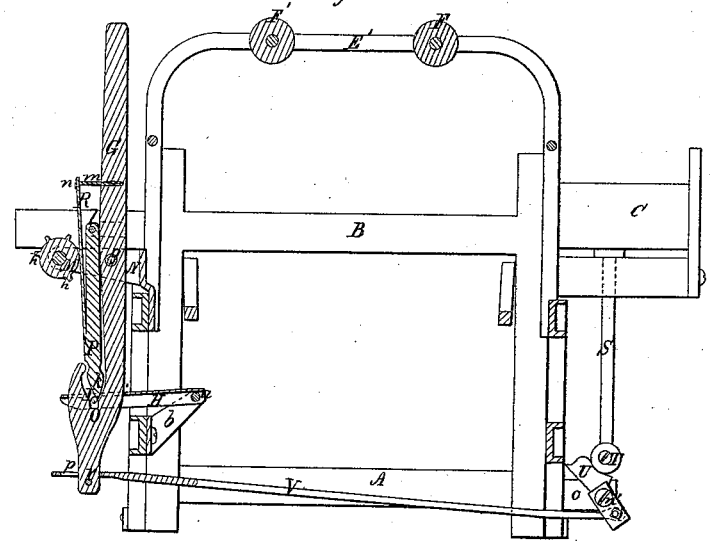
Fig: 7.
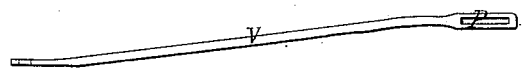
Fig: 8.
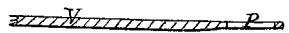

UNITED STATES PATENT OFFICE.

LUCIUS J. KNOWLES, OF WARREN, MASSACHUSETTS.

LOOM.

Specification of Letters Patent No. 15,186, dated June 24, 1856.

*To all whom it may concern:*

Be it known that I, LUCIUS JAMES KNOWLES, of Warren, in the county of Worcester and State of Massachusetts, have invented an Improved Loom for Weaving Checks or Fancy Fabrics; and I do hereby declare that the same is fully described and represented in the following specification and the accompanying drawings, of which—

Figure 1:
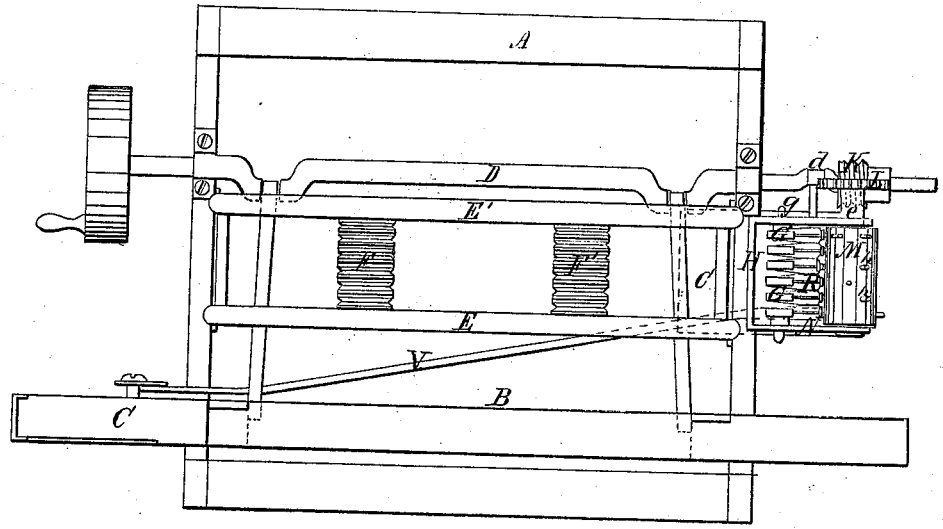
Figure 4:
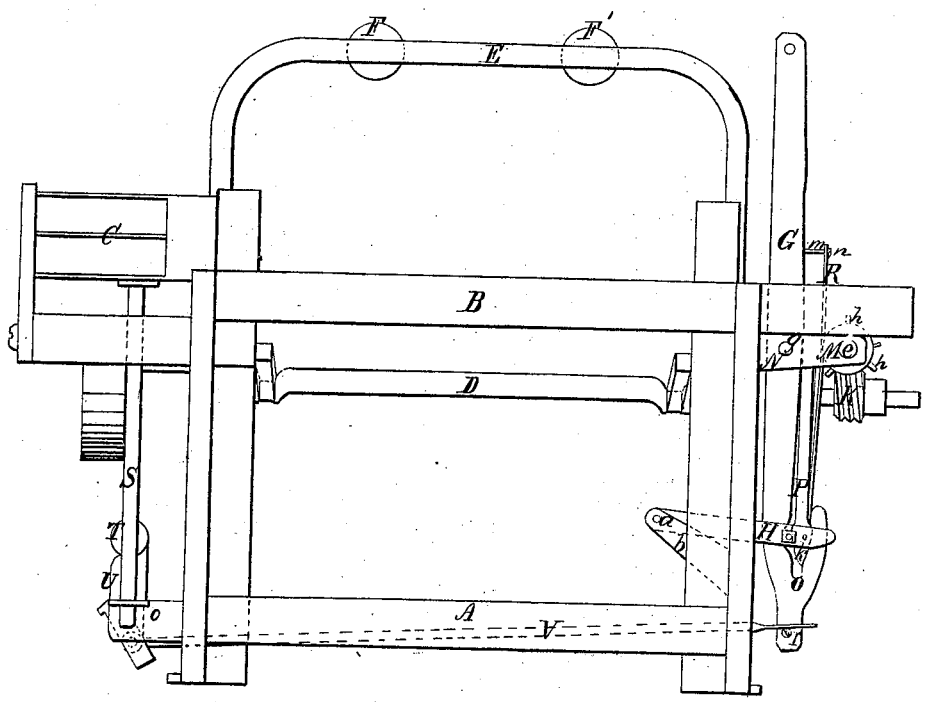

Figure 1, is a top view of the said loom; Fig. 2, an elevation of that end of it at which the harness jacks or levers are situated; Fig. 3, is a vertical and longitudinal section taken so as to show the back side of the lay; Fig. 4, a front elevation.

In these drawings, A, denotes the loom frame; B, the lay; C, a drop double shuttle box applied to said lay in the usual way; D, the crank shaft of the lay; E, E', the standards for supporting the two upper series F, F', of the harness pulleys; G, G, the jacks or operating levers of the harnesses; H, a lifter frame carrying a "knife" or lifter bar I, the whole being arranged as shown in the drawings.

To each of the jacks or harness levers, a harness may be applied in the usual way. The lifter frame, H, turns vertically on a fulcrum or horizontal rod, a, and is formed as shown in top view in Fig. 5, the rod, a, being supported by standards, b, b, as shown in Figs. 1, 3, and 4. Such lifter frame has a constant vibrating motion imparted to it, or is alternately raised and depressed by means of a connecting rod, c, and a bell crank, d, applied to said frame and the shaft D, as seen in Figs. 1, and 2. An endless screw or worm, K, is fixed on the crank shaft, D, and engages with a worm gear, L, fixed upon the horizontal shaft, e, of a toothed pattern cylinder or barrel M, arranged as seen in Figs. 1, 2, and 3, and supported in a bracket or frame N, so as to be capable of being rotated on its axis.

The series of jacks or harness levers G, G, &c., extend downward with the frame, N, and the lifter frame as seen in the drawings, each lever being supported by a rod, g, extended horizontally through the frame N, and the series of levers G, G. The barrel M, is to be provided with teeth or pins h, h, extended from its outer surface and arranged at such distances apart, or in such positions as to cause the springs of the harness jacks or levers to be moved or operated as circumstances may require. Each of the said harness levers is formed with a hook near its lower end or with an angular notch or recess as seen at, O, in Figs. 3, and 6, the latter being a view of one of the levers or jacks as detached from the remainder of the series thereof. Into each of the said angular recesses, O, there extends a tongue or vibrator, P, whose lower end is formed angular as shown at k, such vibrator being otherwise shaped as exhibited in the drawings, and hinged at its upper end to the lever, G, as seen at, l. This vibrator moves like a pendulum, and from one side of the notch, O, to the opposite side thereof, and it has a spring, R, affixed to it just above the notch O, and extending upward between the barrel, M, and said vibrator and above the hinge, l, of the latter and made at its upper end to slide on a pin, m, extended from the lever and provided with a head or stop, n, as seen in the drawings. Each of the jacks or levers is so provided with a pendulous vibrator P, a notch O, and a spring R.

From the above it will be seen that when the lifter rod is being moved, either the elevation or depression of a harness will depend on the position of the vibrator of its jack, that is to say, whether said vibrator be in contact with one side or the other of its notch, O, as when it is in contact with that side which is next to the loom frame, the jack will be so moved when the lifter rod, I, is being elevated, as to raise the harness connected with its jack, for the lifter rod, under such circumstances will press against the outer inclined side of the angular lower part of the vibrator and by so doing will move the jack so as to elevate the harness thereof. But when the vibrator, P, is in contact with the outer side of the notch, O, and the lifter is being elevated, the jack of such vibrator will be caused to move so as to depress its harness. The movements of the several vibrators are governed by their springs R, R, and the action of the toothed barrel, M, against said springs; and in consequence of the uniform rotary motion which is given to the crank shaft D a uniform or continuous, but not an intermittent rotary motion will be imparted to the barrel, M, by the peculiar action of the endless screw K, and the worm gear L, the springs R, R, allowing such motions to take place without any improper disturbance of their jacks. Each spring also when relieved from the pressure of a pin of the barrel throws its vibrator outward against the outer side of the notch or recess, O, of said vibrator. So while the spring is being pressed backward by a tooth of the barrel the vibrator will be pressed toward the inner side of the notch; this arising from the peculiar arrangement of the spring, the barrel and the supporting pins of the spring and vibrator.

By my improved mechanism, I am able to maintain a continuous motion of the barrel M, instead of an intermittent rotary motion of it as in various other looms. Such a continuous or interrupted rotary motion of the pattern cylinder or barrel, M, is a matter of great importance, not only on account of the small amount of mechanism required to produce it, but for other reasons which will be apparent to weavers.

The drop shuttle box, C, is supported on a vertical rod, S, which has a friction roller applied to it as seen in Fig. 3, such roller being made to rest against an elevator or cam lever U, arranged and supported on a fulcrum or pin, $n'$, extended from a strut, $o$, projecting from the lay as shown in said Fig. 3. The form of the elevator, U, is shown in Fig. 3, its upper arm being cam shaped. To the lower arm of the elevator, a rod, V, is jointed and is made to extend toward some one of the jacks and to receive said jack through a slot, $p$, formed in said rod as seen in Figs. 1, 7, and 8, Fig. 7, being a top view, and Fig. 8, a vertical and longitudinal section of the slotted end of the rod, V. A pin $r$, extending through the lower part of the jack or lever, G, serves to support the outer end of the rod, V. The length of the slot, $p$, should be just sufficient to enable the lever, G, to move forward and backward in said slot and produce no motion of the rod, V, while the drop box is required to remain either in its highest or lowest position. Under these circumstances, the pattern barrel, M, is to have pins arranged in it at proper distances apart, for the purpose of moving the vibrator of the lever of the rod, V, as circumstances may require in order that the rod, V, may be moved endwise, either in one direction or the other and so be made to operate the elevator, U, as to effect the raising and lowering of the drop box in the order required to operate a loom with two shuttles.

From the above, it will be seen, that the object of the vibrator, P, and the angular notch O, is to enable the vibratory knife bar or lifter rod, I, to move a jack or harness lever, G, so as either to raise or depress its harness as circumstances may require. Also, that the object of the spring, R, is to enable the pattern barrel, M, to be continuously rotated or maintained in a constant and not in an intermittent rotary motion while the weaving operation is being carried on, and the lay is in movement. Also, that the object of the rod, S, the elevator, V, the friction roller, T, and the slide rod or bar, V, is to operate the drop box, by a harness lever or jack, or a lever of such kind, and the rotary toothed cylinder M, or harness jacks, instead of having a separate toothed cylinder for accomplishing the same as hitherto practiced.

I do not claim the combination of the vibrator P, and the angular notch, "O," with either of the levers or jacks, G, of the harnesses and so as to operate in connection with the lifter rod, I, substantially as hereinbefore specified because I am aware that such has been the subject of a portion of the invention for which a patent was granted to Benj'n F. Rice on the 18th day of October A. D. 1853, my invention being in part an improvement thereon and subordinate thereto: Nor do I claim, for operating the vibrator, the mode described in the patent of the said Rice, wherein the pattern chain is represented as having an intermittent rotary motion while at work and made to move the vibrator by the alternate actions of pins and hooks in a cam groove formed at the upper part of the vibrator or in an arm projecting above its fulcrum, my improvement enabling the spring arm not only to perform all the functions necessary to move the vibrator, but the additional one, viz., that of allowing the toothed cylinder M, to be continually revolved, important advantages both in the construction and operation being gained thereby.

What therefore I do claim as my invention is—

1. The application of the spring, R, to the jack, G, the vibrator P and the toothed cylinder substantially in manner and under their arrangement as described in order to enable the cylinder, M, not only to effect the movements of the vibrator by the aid of its spring, but to be continuously rotated or maintained in constant and not in intermittent rotary motion, all substantially as specified.

2. I also claim combining the double shuttle or drop box, C, with one of the levers or jacks, G, (operated as described) by means substantially as hereinbefore explained (viz, the rod, S, the elevator, U, the friction roller, T, and slide bar, V,) and so that such drop box may be operated by the toothed cylinder of the harness levers or jacks.

In testimony whereof I have hereunto set my signature this twenty third day of April A. D. 1856.

LUCIUS J. KNOWLES. [L. S.]

Witnesses:
 MARY G. HITCHCOCK,
 JOS. F. HITCHCOCK.